(12) United States Patent
Simcic

(10) Patent No.: US 8,795,747 B2
(45) Date of Patent: Aug. 5, 2014

(54) FOODSTUFF CONTAINING PACKAGING, THE FOODSTUFF BEING FRESH AND NATURAL KIWI FRUIT

(76) Inventor: Marjan Simcic, Cerknica (SI)

(*) Notice: Subject to any disclaimer, the term of this patent is extended or adjusted under 35 U.S.C. 154(b) by 509 days.

(21) Appl. No.: 12/743,614

(22) PCT Filed: Oct. 14, 2008

(86) PCT No.: PCT/EP2008/065585
§ 371 (c)(1),
(2), (4) Date: May 19, 2010

(87) PCT Pub. No.: WO2009/068451
PCT Pub. Date: Jun. 4, 2009

(65) Prior Publication Data
US 2010/0285184 A1    Nov. 11, 2010

(30) Foreign Application Priority Data

Nov. 29, 2007  (IT) .............................. BO20070079 U

(51) Int. Cl.
*B65D 85/34* (2006.01)

(52) U.S. Cl.
USPC ........................... 426/115; 426/110; 426/134

(58) Field of Classification Search
CPC ...... A23G 9/503; A23L 1/2123; A23B 7/148; B65D 85/34
USPC ......................................... 426/115, 110, 134
See application file for complete search history.

(56) References Cited

U.S. PATENT DOCUMENTS

| | | |
|---|---|---|
| 3,418,139 A | 12/1968 | Craig |
| 5,523,293 A * | 6/1996 | Jane et al. ..................... 530/356 |
| 6,177,110 B1 * | 1/2001 | Chan ................................ 426/90 |
| 2002/0150655 A1 * | 10/2002 | O'Donnell Kiely ............. 426/89 |
| 2005/0249844 A1 * | 11/2005 | Rosskamp ..................... 426/115 |
| 2008/0279992 A1 * | 11/2008 | Kahn ............................. 426/134 |

FOREIGN PATENT DOCUMENTS

| | | | | |
|---|---|---|---|---|
| CH | 686 478 | * | 4/1996 | ............... A23G 9/26 |
| DE | 7931273 U1 | | 3/1980 | |
| GB | 2 293 751 | * | 10/1994 | ............... A23G 9/00 |

OTHER PUBLICATIONS

Kiwi on a Stick Photo, [taken on] Aug. 25, 2005, retrieved on 20/20/2012. Retrieved from the Internet: URL:<http://www.flickr.com/photos/speedracer4kq/304364850/>.*
Kiwi on a Stick Photo, [taken on] Sep. 11, 2007, retrieved on Feb. 21, 2012. Retrieved from the Internet: URL:<http://www.flickr.com/photos/keithkerr/1360819697/>.*
Kiwi on a Stick Photo, [taken on] Nov. 19, 2005, retrieved on Feb. 21, 2012. Retrieved from the Internet: URL:<http://www.flickr.com/photos/69673635@N00/64763825/>.*
Genki-drifters, I (Heart) Singapore, Kiwi on a Stick Photo, [on line] Feb. 28, 2006, retrived on Feb. 21, 2012. Retrieved from the Internet: URL<http://blog.travelpod.com/travel-blog-entries/genki-drifters/thailand2006/1141141800/tpod.html>.*
Pivonka, E., 5-A-Day column, Kiwi on a Stick, [on line] Aug. 15, 2003, retrieved on Feb. 21, 2012. Retrieved from the Internet: URL:<http://www.napsnet.com/pdf_archive/42/56747.pdf>.*
International Search Report.

* cited by examiner

*Primary Examiner* — Rena L Dye
*Assistant Examiner* — Chaim Smith
(74) *Attorney, Agent, or Firm* — William J. Sapone; Ware Fressola; Maguire & Barber LLP

(57) ABSTRACT

Packaging comprising:—at least a foodstuff (2), the foodstuff being a fresh, peeled and natural kiwi,—an atoxic wrapping (4) completely sealed in which said foodstuff (2) is completely contained, and—a handgrip element (3) associated or associable with said foodstuff (2).

12 Claims, 3 Drawing Sheets

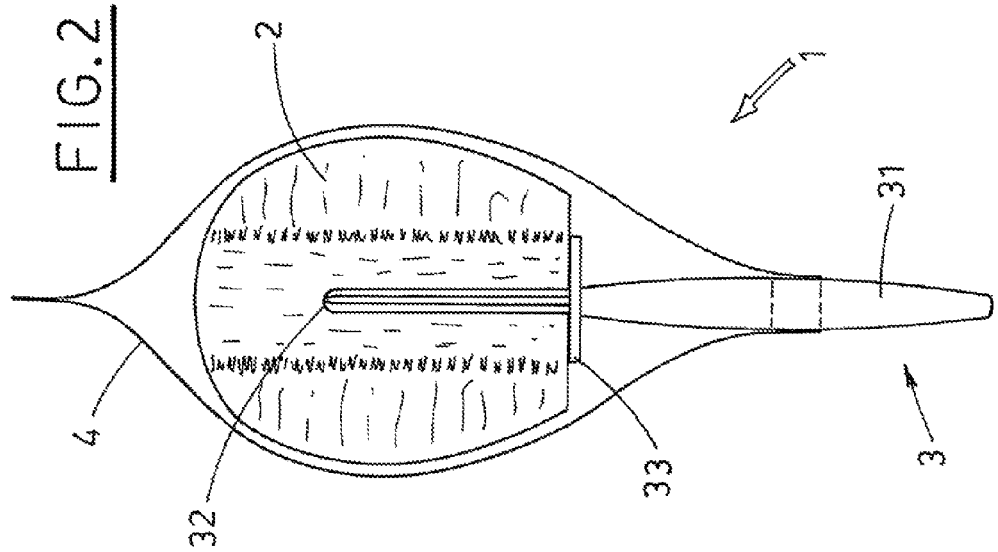
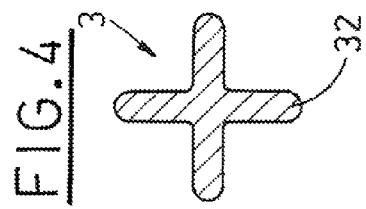
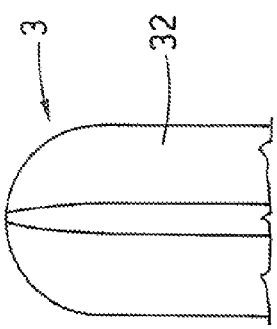
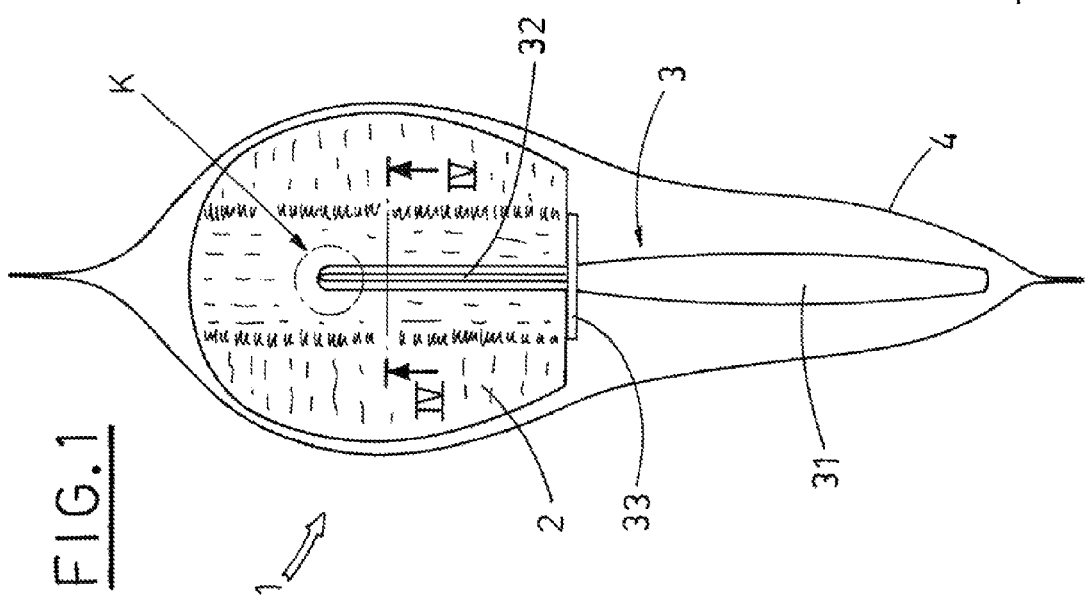

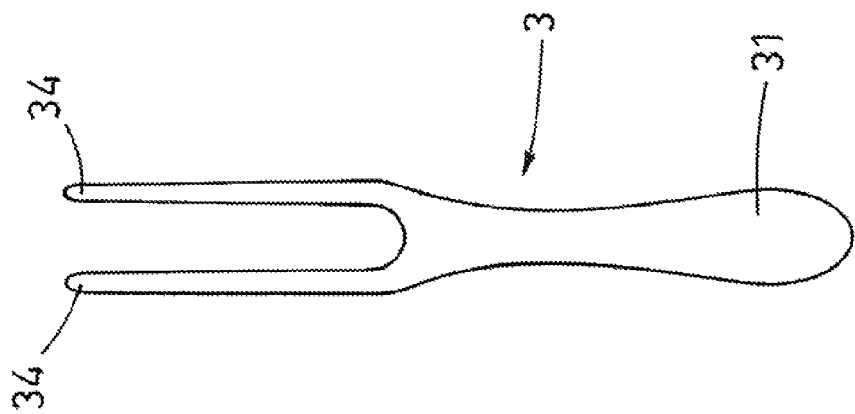
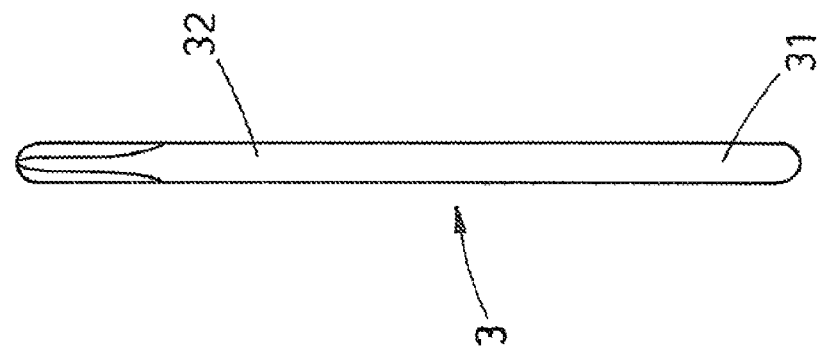
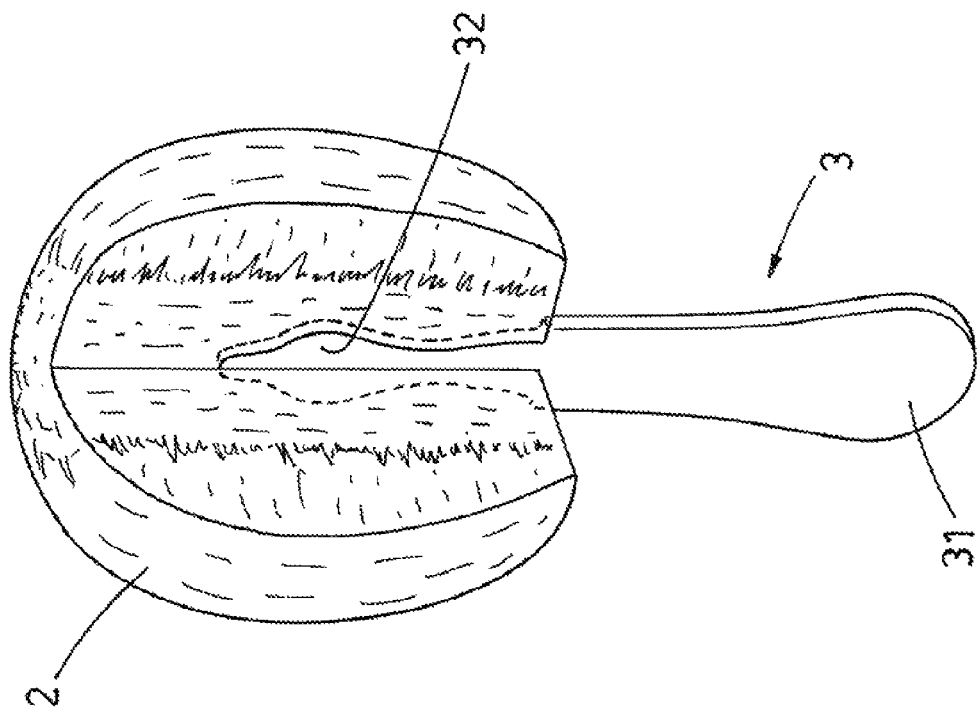

FOODSTUFF CONTAINING PACKAGING, THE FOODSTUFF BEING FRESH AND NATURAL KIWI FRUIT

FIELD OF THE INVENTION

The present invention relates to the technical field concerning the packaging of natural kiwi fruit.

DESCRIPTION OF THE KNOWN ART

Nowadays, the *Actinidia Chinensis* berries, more commonly known as kiwi fruit, are sold intact and therefore as a whole with the peel in different types of packaging made by suitable machines, or loose, for example in suitable bags, for ease of transport.

Usually, once removed from the respective packaging or bag, the kiwi fruits are manually peeled, for example by means of a common knife so that one can eat its pulp.

Said peeling operation is frequently performed by the same people who want to eat the fruit (or, naturally by relatives or friends), also when kiwi fruits are not consumed in their respective homes but for example are provided in the so called self service restaurants, in the work or school canteens or in many hotels.

It is commonly known that when manually peeling fruits, whose peel is very adherent to the pulp contained inside the same (in particular the so called endocarp), as it is the case of kiwi fruits but not for example of oranges and mandarins, the fleshy pulp itself produces a significant amount of juice which usually pours or sprays and then for example spreads on the top on which the fruit is peeled, on the hands of the person who is peeling it, and in the worst case also on the clothes and on the floor. Besides the considerable inconvenience and the waste of an important portion of the foodstuff due to the juice spreading, the manual peeling implies also the annoying need to wipe the juice itself and to clean the surfaces on which it is spread, this being not always easy every time the kiwi fruits are consumed.

The above-mentioned disadvantages grow enormously when the kiwi fruit is peeled by teenagers, by old or disabled people.

Another disadvantage of the conventional way of consuming kiwi fruits is that, as it is clear from the preceding description, its consumption requires more time with respect to the time needed to consume other berries as strawberries or citrus fruits as for example mandarins; this fact being in clear contradiction with the selling and consuming philosophy of the shops providing such fruits, as for example the above-mentioned self service restaurants.

SUMMARY OF THE INVENTION

Each above-mentioned disadvantage and others more are solved by means of a packaging according to the claim 1, the packaging comprising:
  at least a foodstuff, the foodstuff being a fresh, peeled and natural kiwi fruit,
  an atoxic wrapping, completely sealed, in which said foodstuff is completely contained, and
  a handgrip element associated or associable with said foodstuff.

The present technical solution allows, in every place and in every situation, to consume said foodstuff, it being preferably an unique, intact and completely peeled kiwi fruit, by simply opening said wrapping and by holding said kiwi fruit by means of said handgrip element, without the need to employ a top where to lean the kiwi fruit, and without the need to peel the kiwi itself by means of utensils, whose usage is perfectly useless in order to make use of the present invention in a correct and effective way.

The handgrip element can be realized in an edible material, in atoxic plastic or in wood and it could be configured as a gadget, as a game, as cutlery or as means for information concerning the foodstuff or for advertising information or for other purposes, so that it could be even kept by the consumer, when desired after eating the kiwi fruit.

Suitable machine, not described herein because yet known and because the description of their structural and configurative characteristics is not part of the aims of this document, peel these foodstuffs in a way which gives back the kiwi fruits intact and completely free of peel.

Therefore by using the present invention, the consumer has the possibility to eat a fresh, ready to be consumed and yet perfectly peeled kiwi fruit, so that the possibility to get dirty is minimally reduced and he is not obliged to sit at a table to eat it.

According to the present invention, for example the kiwi fruit could be packaged under-vacuum, under-air or advantageously in controlled atmosphere in order to slow down the so called "breathing".

Moreover, by means of the invention, it is provided a natural kiwi fruit which can be transported in its packaging, without the slightest risk that it could go bad or dirty or damaged, in order to be able, if needed, to eat it immediately when desired, all this being possible without the fruit being subjected to preservation or treatment processes intended to alter its organoleptic proprieties.

Advantageously, the invention allows to overcome the technical-commercial prejudices which consider the kiwi fruit not suitable to be consumed in fast food restaurants or on board of means of transport as for example undergrounds or aircrafts, or generally every time the consumer has not a stable chair and a stable table with respect to the floor, at ones disposal.

According to an advantageous aspect of the invention, the wrapping comprises means for local reducing its toughness, for helping to manually open the same, said means for reducing toughness being obtained on a wrapping portion, opposite to the one nearest to the handgrip element. In this way, by holding the packaging in a vertical position, the consumer can unwrap the wrapping in its upper portion, hold the packaging by its lower portion by grasping the handgrip element through the wrapping and then crumple the wrapping to the bottom so as to eat the kiwi fruit as an ice-cream or an ice lolly.

Very advantageously, this implies that the few possible kiwi juice droplets which could go down along the fruit and/or along the handgrip element, collect between the folds of the crumpled wrapping, so that the risk that these droplets dirty the hands of the consumer or spread around, for example by falling down on the floor, is completely nullified.

The means for local reducing the wrapping toughness can be provided by suitably joining and gluing the edges defining the opening of the wrapping itself, by methods widely known to those skilled in the technical field of packaging foodstuffs.

BRIEF DESCRIPTION OF THE DRAWINGS

The features of the invention, not emerging from the preceding disclosure, will be better highlighted in the following, in which a preferred embodiment thereof is described according to the claims and by reference to the drawings, in which:

FIG. 1 is a schematic longitudinal sectioned view of the packaging according to a first particular version of the present invention;

FIG. 2 is a schematic longitudinal sectioned view of the packaging according to a second particular version of the same inventive concept as in FIG. 1;

FIG. 3 shows an enlarged detail of FIG. 1;

FIG. 4 is a schematic cross section of a handgrip element comprised in the packaging;

FIG. 5 is a sectioned side view of a foodstuff contained in the packaging, wherein a respective handgrip element is associated with it;

FIG. 6 is a schematic side view of the handgrip element according to a particular embodiment thereof;

FIG. 7 is a schematic side view of the handgrip element according to another particular configuration thereof;

DESCRIPTION OF PREFERRED EMBODIMENTS

Figure 8:
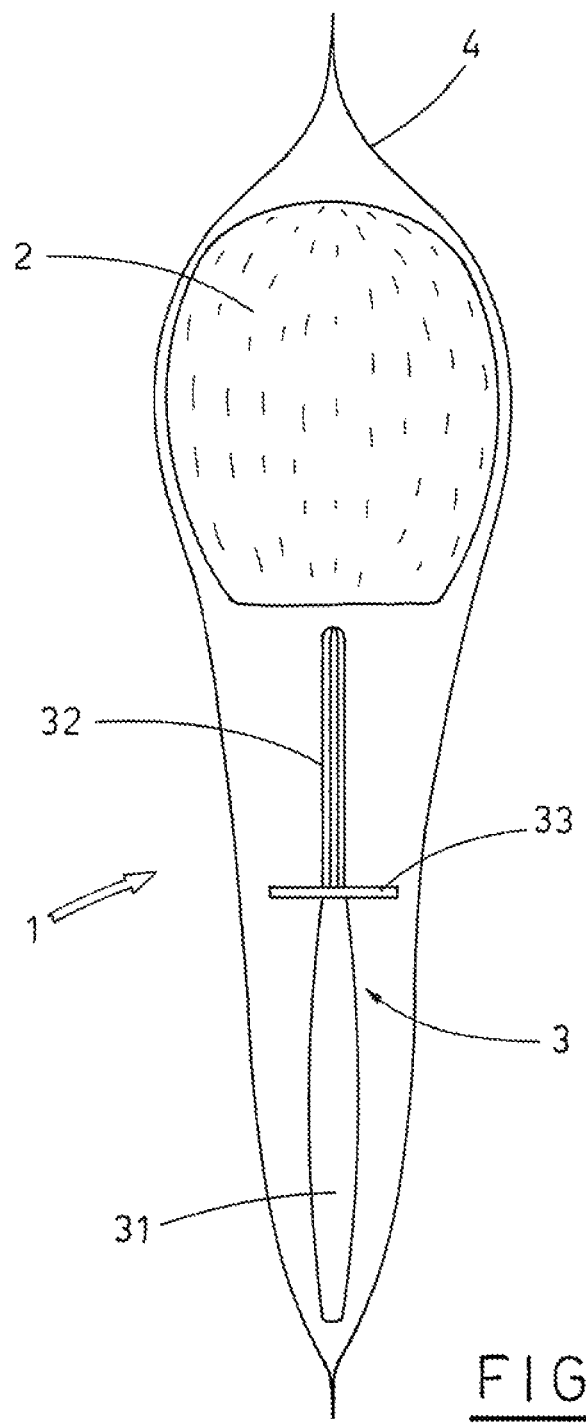
FIG. 8 is a schematic cross section of the packaging according to a particular version of the present inventive concept.

Referring to the above-mentioned figures, the reference number 1 indicates a packaging comprising:
- a foodstuff 2, the foodstuff being a fresh, peeled and natural kiwi fruit,
- an atoxic wrapping 4, completely sealed in which said foodstuff 2 is completely contained, and
- a handgrip element 3 associated or associable with said foodstuff 2.

In the shown example, the foodstuff 2 is only a unique, completely free of peel, fresh, natural and intact kiwi fruit.

As shown in FIGS. 1, 2 and 5, the foodstuff 2 is partially crossed by said handgrip element 3, the handgrip element 3 being as a consequence partially stuck into the foodstuff 2.

FIG. 1 shows the inventive concept according to a version wherein the handgrip element 3 is completely contained in the wrapping 4, whereas FIG. 2 shows a version wherein a portion of the handgrip element 3 is partially outside the wrapping 4, without this slightly compromising its sealing, thanks to seal means comprised in the wrapping 4 itself and crossed by the handgrip element 3; said seal means being not shown in detail in the appended drawings because widely known in the technical field of food packaging.

In the chosen example, the handgrip element 3 comprises a first grasping section 31 and a second introduction section 32, which can be obtained for example in the monolithic body of the same handgrip element 3 (see FIGS. 1, 2, 5, 6 and 7); according to a particular aspect of the invention, between said sections (31,32) being possible to dispose a shoulder 33 (see FIGS. 1 and 2) which extends radially with respect to the handgrip element 3 itself, is obtained as an unique body with it and is configured substantially as a disc.

The figures clearly show that the section 32 is intended to penetrate inside the fruit, for example in the innermost portion of the endocarp, the section 31 is intended to manual grasping the foodstuff 2 so that it can be consumed in an easier way, and the shoulder 33 performs both the functions of stopping the section 32 penetrating the kiwi fruit (such penetration provided for example before packaging by a suitable machine or as an alternative, as it will be clear in the following, by the same consumer after packaging) and of preventing the foodstuff 2, partially or as a whole, from sliding to the bottom along the handgrip element 3, when the latter is held in vertical position by the consumer, while he is eating the kiwi fruit.

FIG. 3 shows an enlarged detail of the end of the section 32, indicated by K in FIG. 1, which is adapted to penetrate deep in the foodstuff 2, the end being rounded-shaped in order to avoid that the handgrip element 3,—once separated from the kiwi, becomes a sort of makeshift weapon.

As it is shown in FIG. 4, the section 32 is such configured that it has a cross-like section extending along its whole longitudinal extension in order to easier penetrate the foodstuff 2.

By way of example, FIGS. 5, 6 and 7 show some configurations of the handgrip element 3 (which are still part of the inventive concept), and respectively: a flat handgrip element 3, for example made in wood, a handgrip element 3 whose introduction section 32 is provided with a cross-like transverse section only at and near its end destined to deep penetrate the foodstuff 2 and a handgrip element 3 configured as a fork, whose section 32 comprises two tines 34 destined to penetrate inside the kiwi fruit.

According to a further variant of the same above-described inventive concept, shown in FIG. 8, it is provided a packaging 1, in which the foodstuff 2 and the handgrip element 3 are separated, the latter being in particular positioned substantially axially with respect to the foodstuff 2. Therefore, in order to eat the kiwi, the consumer has nothing to do but very easily grasp the foodstuff 2 by one hand by means of the wrapping and the handgrip element 3 by the other hand, push the handgrip element 3 so that its section 32 penetrates the fruit, to open thereafter the wrapping when he desires to eat the kiwi contained inside. Obviously, it is possible to provide such variant so that the section 31 is at least partially outside the wrapping 4 (example not shown as easily deducible by the appended drawings and by the present description).

It is intended that the preceding description is purely exemplary and not limiting, therefore possible practical variations are intended to fall in the protective scope of the invention, as defined by the preceding description and by the following claims.

The invention claimed is:

1. A package containing a single ready to eat fresh, peeled and intact natural kiwi comprising:
    a fresh, peeled and intact natural kiwi; an atoxic wrapping for forming the package, the wrapping completely containing the fresh, peeled and intact natural kiwi therein, the wrapping being openable by a user; and,
    a gripping element having an introduction section disposed within an innermost portion of an endocarp of the fresh, peeled and intact natural kiwi, the introduction section being flat and having a forward end adapted to penetrate the endocarp of the fresh, peeled and intact natural kiwi and to engage and be retained within the innermost portion, the introduction section having a length adapted to partially penetrate into the innermost portion, along a centerline of the fresh, peeled and intact natural kiwi, and to terminate therein, the forward end securely attaching the fresh, peeled and intact natural kiwi to the gripping element, the gripping element having a flat gripping section with a rounded end which extends away from the fresh, peeled and intact natural kiwi, the flat gripping section with the rounded end being surrounded by the wrapping, the wrapping completely containing the fresh, peeled and intact natural kiwi, and the flat, gripping section extending therefrom, the wrapping being sealed to form a sealed package, the flat gripping section being manually grippable through the wrapping located thereover such that a user can open the wrapping to expose and consume the fresh, peeled and intact natural kiwi, which is held firmly by the forward end of the introduction section which partially crosses through and is retained within the kiwi, the opened wrapping disposed above the flat gripping section forming a container adapted to contain any dripping fluid during consumption of the fresh, peeled and intact natural kiwi, the fresh, peeled and intact natural kiwi being held firmly by the forward end of the introduction section which partially crosses through and is retained within the kiwi wherein the gripping section is disposed entirely within the wrapping.

2. The package according to claim 1 wherein foodstuff is disposed in the wrapping in a controlled atmosphere.

3. The package according to claim 1 wherein said wrapping is openable in an upper portion thereof, a lower portion of the wrapping being disposed about the gripping section of the gripping element.

4. The package according to claim 1 further comprising a shoulder positioned between said introduction section and said gripping section of said gripping element, the shoulder extending radially with respect to the gripping element.

5. The package according to claim 1 wherein said introduction section has a free end which has a rounded shape and a cross-like cross-section.

6. The package according to claim 1 wherein the forward end has a cross-like transverse section.

7. A package containing a single ready to eat fresh, peeled and intact natural kiwi comprising:

a fresh, peeled and intact natural kiwi; an atoxic wrapping for forming the package, the wrapping completely containing the fresh, peeled and intact natural kiwi therein, the wrapping being openable by a user; and, a gripping element having an introduction section disposed within an innermost portion of an endocarp of the fresh, peeled and intact natural kiwi, the introduction section being flat and having a forward end adapted to penetrate the endocarp of the fresh, peeled and intact natural kiwi and to engage and be retained within the innermost portion, the introduction section having a length adapted to partially penetrate into the innermost portion, along a centerline of the fresh, peeled and intact natural kiwi, and to terminate therein, the forward end securely attaching the fresh, peeled and intact natural kiwi to the gripping element, the gripping element having a flat gripping section with a rounded end which extends away from the fresh, peeled and intact natural kiwi, the flat gripping section with the rounded end being surrounded by the wrapping, the wrapping completely containing the fresh, peeled and intact natural kiwi, and the flat, gripping section extending therefrom, the wrapping being sealed to form a sealed package, the flat gripping section being manually grippable through the wrapping located thereover such that a user can open the wrapping to expose and consume the fresh, peeled and intact natural kiwi, which is held firmly by the forward end of the introduction section which partially crosses through and is retained within the kiwi, the opened wrapping disposed above the flat gripping section forming a container adapted to contain any dripping fluid during consumption of the fresh, peeled and intact natural kiwi, the fresh, peeled and intact natural kiwi being held firmly by the forward end of the introduction section which partially crosses through and is retained within the kiwi wherein the gripping section passes through the wrapping, the wrapping being sealed around the gripping section to prevent fluid leakage therethrough.

8. The package according to claim 7 wherein foodstuff is disposed in the wrapping in a controlled atmosphere.

9. The package according to claim 7 wherein said wrapping is openable in an upper portion thereof, a lower portion of the wrapping being disposed about the gripping section of the gripping element.

10. The package according to claim 7 further comprising a shoulder positioned between said introduction section and said gripping section of said gripping element, the shoulder extending radially with respect to the gripping element.

11. The package according to claim 7 wherein said introduction section has a free end which has a rounded shape and a cross-like cross-section.

12. The package according to claim 7 wherein the forward end has a cross-like transverse section.

\* \* \* \* \*